US005997941A

United States Patent [19]

Dannenhauer et al.

[11] Patent Number: 5,997,941

[45] Date of Patent: Dec. 7, 1999

[54] PROCESS FOR REPAIRING PAINT FAULTS IN PAINT LAYERS

[75] Inventors: Fritz Dannenhauer, Hasel; Anja Keller, Blaustein; Juergen Hanf, Tuebingen; Klaus Sussmann, Leonberg; Claudia Witt, Eberdingen, all of Germany

[73] Assignees: DaimlerChrysler AG, Stuttgart; Eisenmann Maschinenbau KG, Boeblingen; Micro Compact Car AG, Biel/Schweiz; Karl Woerwag Lack—und Farbenfabrik GmbH & Co. KG, Stuttgart, all of Germany

[21] Appl. No.: 08/969,772

[22] Filed: Nov. 13, 1997

[30] Foreign Application Priority Data

Nov. 13, 1996 [DE] Germany .......................... 196 46 956

[51] Int. Cl.[6] ...................................................... B32B 35/00

[52] U.S. Cl. .......................... 427/140; 427/270; 427/287; 427/385.5; 427/388.2

[58] Field of Search ................................ 427/140, 385.5, 427/388.2, 270, 287

[56] References Cited

U.S. PATENT DOCUMENTS 4,960,611 10/1990 Fujisawa et al. ....................... 427/140

FOREIGN PATENT DOCUMENTS 0 444 446 9/1991 European Pat. Off. .
195 39 065 4/1997 Germany .
1-315374 12/1989 Japan .

*Primary Examiner*—Janyce Bell
*Attorney, Agent, or Firm*—Evenson, McKeown, Edwards & Lenahan, P.L.L.C.

[57] ABSTRACT

A process for repairing relatively small paint faults in powder coating layers, in which, in the region of the faulty point, a cutout is introduced into the powder coating layer with precisely defined dimensions with respect to its area and also with respect to its depth. A filler made of powder coating and/or a pre-product of the powder coating is introduced into the cutout. The filler is dimensioned to correspond to the volume of the cutout, in particular corresponding to the dimensions of the cutout, and is coherent. The filler introduced is joined, in particular bonded, to the powder coating layer arranged outside the cutout.

21 Claims, 3 Drawing Sheets

PROCESS FOR REPAIRING PAINT FAULTS IN PAINT LAYERS

BACKGROUND AND SUMMARY OF THE INVENTION

This application claims the priority of German application 196 46 956.2, the disclosure of which is expressly incorporated by reference herein.

The invention relates to a process for repairing paint faults in paint layers, particularly paint faults of relatively small size in powder coating layers.

A process for the repair of paint faults is known from Japanese patent document JP 1-315 374 (A), from which it is known to remove relatively small paint faults, so-called hot-spots, by means of a drill. The remaining, largely cylindrical cutout is filled with a liquid repair paint, which is partly covered with a mask. The mask has a clearance in the region of the cutout filled with repair paint, through which clearance a laser light can be directed onto the repair paint. By means of the energy introduced by the laser light, the repair paint is heated and joined to the paint layer surrounding the cutout.

If it is attempted to transfer such a process to powder coating layers made of powder coating and/or powder slurry—referred to below simply as powder coating—the result is unsatisfactory, even with a substantial effort. In the case of so-called effect powder coating layers, which have to be applied using an electrostatic spraying process, a process of this type may be even wholly unsuitable, since then in the region of the cutout the effect of the powder coating layer is not visible and the previously faulty point can still easily be seen. For this reason, inter alia, faulty areas that are powder coated using effect paints are repainted over the entire area.

In the case of repainting using powder coating, in particular in the case of motor vehicles, virtually all parts sensitive to high temperatures and therefore virtually all plastic parts would have to be removed in a manner that costs effort and money, for which reason in this case the repair is generally performed using normal liquid paints. In the case of faulty painting in so-called space frames, which are provided with already colored built-on parts following their painting, although this does not apply to the same extent, nevertheless the effort for the repair is very high here too, and/or in the case of effect powder coatings likewise unsuitable for the reasons already cited.

Thus, there is a need for a process with which even powder coatings, in particular effect powder coatings, can be repaired relatively simply and inexpensively, and with a good visual quality.

These and other needs have been met according to the present invention by providing a process for repairing a paint fault in a powder coating layer, comprising the steps of: removing a portion of said powder coating layer in an area proximate and surrounding said fault to define a cutout having dimensions; forming a filler from at least one of said powder coating and a pre-product of said powder coating, said filler being formed to be at least partially coherent with dimensions corresponding to the dimensions of said cutout; introducing said filler into said cutout; and joining said filler to said powder coating layer defining said cutout.

These and other needs have also been met according to the present invention by providing a repaired powder coating layer formed by: removing a portion of a powder coating layer in an area proximate and surrounding a fault to define a cutout having dimensions; forming a filler from at least one of said powder coating and a pre-product of said powder coating, said filler being formed to be at least partially coherent with dimensions corresponding to the dimensions of said cutout; introducing said filler into said cutout; and joining said filler to said powder coating layer defining said cutout.

According to the present invention, the cutout is introduced with precisely defined dimensions with respect to its area and also with respect to its depth into the powder coating layer. Accordingly, it is subsequently possible to introduce into the cutout a filler made of powder coating and/or a pre-product of the powder coating, which is sized to correspond to the dimensions and volume of the cutout, in particular to provide a mating fit between the filler and the cutout. The filler is at least partially cross-linked prior to introduction into the cutout.

The filler introduced into the cutout is subsequently joined, in particular bonded or fully cross-linked, to the powder coating layer defining the cutout. The joining between the cutout and the filler takes place along at least a portion of the mating dimensions therebetween, and optionally along an entirety of the mating dimensions.

The repair according to the invention can be performed rapidly and relatively inexpensively. At the same time, the repair can also be performed on the production line, which is in particular beneficial in the case of vehicles having a self-supporting frame according to the space-frame concept. At the same time, by comparison with a repair over a large area using wet paint, the repair process has a low emission, due to the limited size of the repaired area as well as the use of an at least partially cross-linked filler, which results in a lower outlay on filters and cleaning, as well as a lower outlay on disposal and overspray. Hence, these advantages result in a reduced overall cost of the process.

Other objects, advantages and novel features of the present invention will become apparent from the following detailed description of the invention when considered in conjunction with the accompanying drawings.

DETAILED DESCRIPTION OF THE DRAWINGS

Figure 1:
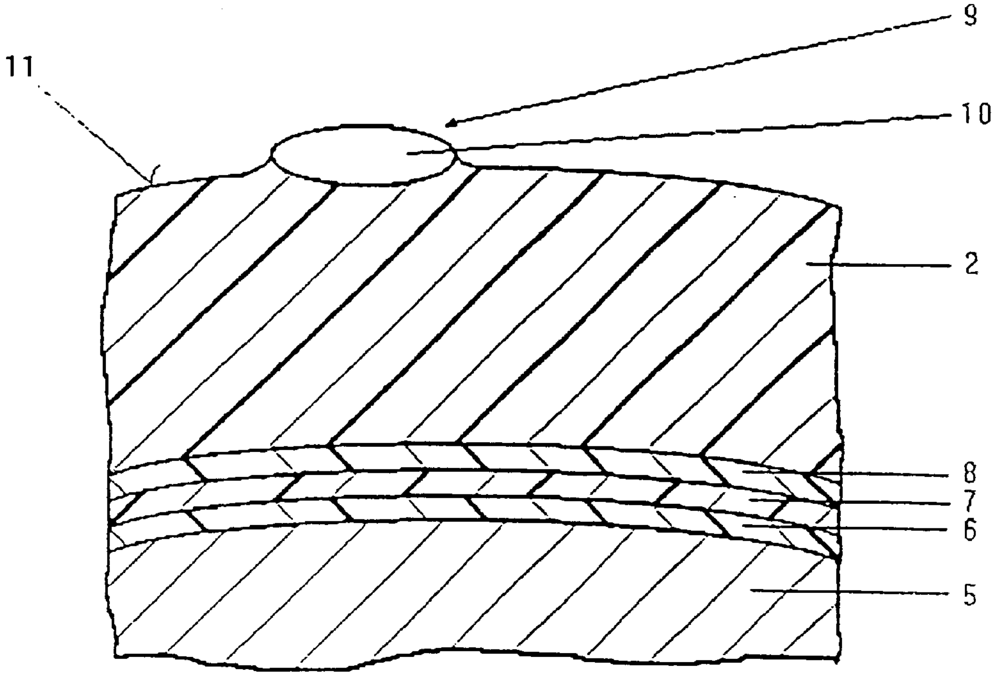
FIG. 1 shows a detail of a section through a substrate painted with powder coating and having a fault.

Illustrated in FIG. 1 is a detail of a section through a substrate 5 provided with a powder coating layer 2. The substrate 5 can be produced, for example, from metal, plastic and/or fibre-reinforced plastic. Furthermore, the substrate 5 may—as illustrated—be curved. Applied to the substrate 5, in addition to the powder coating layer 2, which is in particular up to 100 μm thick, are, for example, the usual layers, specifically a priming layer 6, an anti-chip layer 7 and a filler layer 8. Depending on the application, it is of course possible for the powder coating layer to be thicker.

Drawn as the faulty point 9 is a body of oval cross-section, which may be, for example, a speck of dust 10, which has deposited on the visible surface 11 of the powder coating layer 2 during the application of the powder of the powder coating, and is joined to the powder coating.

Figure 2:
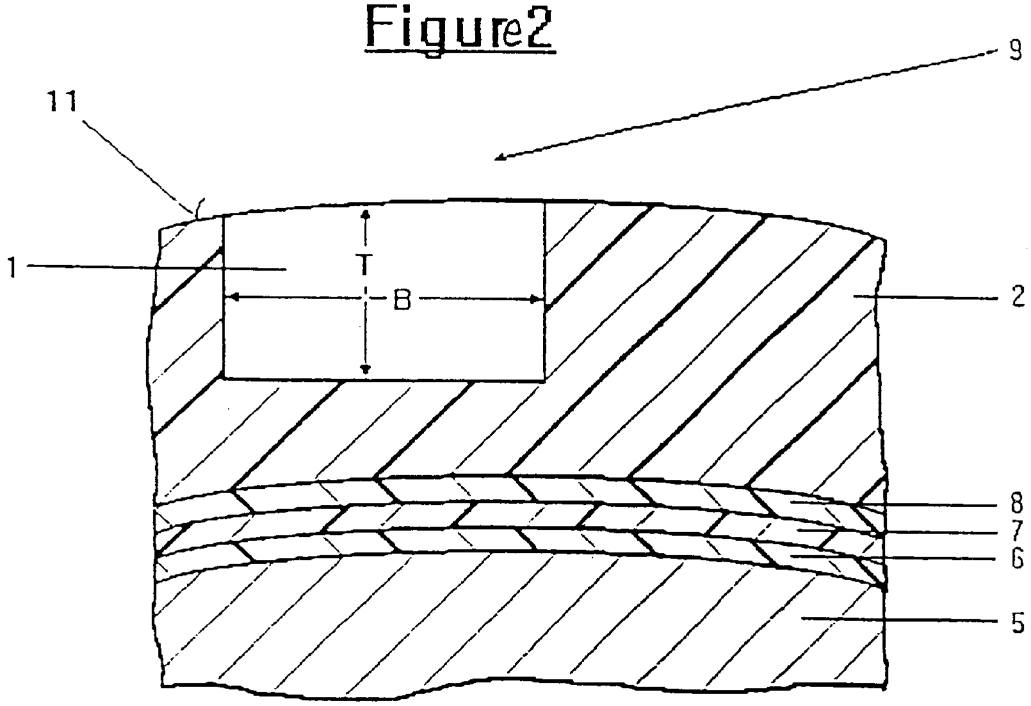
FIG. 2 shows FIG. 1 with the fault removed in a cylindrical cutout according to a preferred embodiment of the present invention.

In order to repair the faulty point 9 in a closely limited area, as is illustrated in FIG. 2, the faulty point 9 of the powder coating layer 2, which is in particular set and hardened, is removed in a closely limited area in a cylindrical cutout 1. By means of the cutout 1, which maximally extends to the depth of the powder coating layer 2, the dust speck 10 is removed at the same time in the present case.

The cutout 1 is expediently introduced into the powder coating layer 2 by removing material, and in this case in particular by means of milling or grinding. Furthermore, the cutout 1 can also be drilled and/or cut out with a hole saw and/or burnt out by means of a laser and/or stamped out and/or ground. In the case of all methods of introducing the cutout 1 into the powder coating layer 2, care should be taken that the cutout 1 is introduced into the powder coating layer 2 with precisely defined dimensions with respect to its area or width B (i.e. diameter) and also with respect to its depth T, as well as with a predefined marginal contour.

A platelet-like filler 3 formed from powder coating and/or a pre-product of the powder coating is subsequently introduced into the cylindrical cutout 1; that is to say the contour of the bottom of the filler 3 is flat and matched to the bottom of the cutout 1. Likewise, the margins of the filler 3 are matched to the corresponding margins of the cylindrical cutout 1. The filler 3, that is at least partly cross-linked before being introduced into the cutout 1, is dimensioned to correspond to the volume of the cutout 1 and is constructed in a coherent manner in the sense of monolith; that is to say the diameter of the monolithically cohering filler 3 corresponds approximately to the diameter B of the cutout 1, and the layer thickness of the filler 3 corresponds approximately to the depth T of the cutout 1. If a pre-product of the powder coating is used to produce the filler 3, the pre-product may be, for example, a paint film made of components of powder coatings that have been partially cross-linked.

With regard to the filler 3, this precise dimensioning can be realized in a simple way by the filler 3 being shaped from a previously produced paint film, in particular stamped out. In the case of at least some effect powder coatings, this paint film is expediently produced by electrostatic spraying in order to obtain desired optical properties.

The filler 3 arranged in the cutout 1 is joined to the powder coating layer 2 arranged outside the cutout 1. Joining is preferably carried out by means of an adhesive layer 12, which has in particular already been arranged along the appropriate walls of the filler 3 before the introduction of the filler 3 into the cutout 1.

The filler 3 introduced into the cutout 1 and, if appropriate, also the adhesive layer 12, are subsequently heated and/or caused to react. As a result of the heating and/or as a result of the reaction, the filler 3 in particular and, if appropriate, also the adhesive layer 12, cures. The reaction is preferably initiated and/or maintained by UV (ultraviolet) radiation and/or electromagnetic, in particular IR (infrared) radiation, and/or hot air.

Since the filler 3 may exhibit a volume shrinkage during curing, it is expedient to provide the filler 3 with a volume which approximately corresponds to the volume of the cutout 1 plus the volume shrinkage of the filler 3 occurring during curing.

Figure 3:
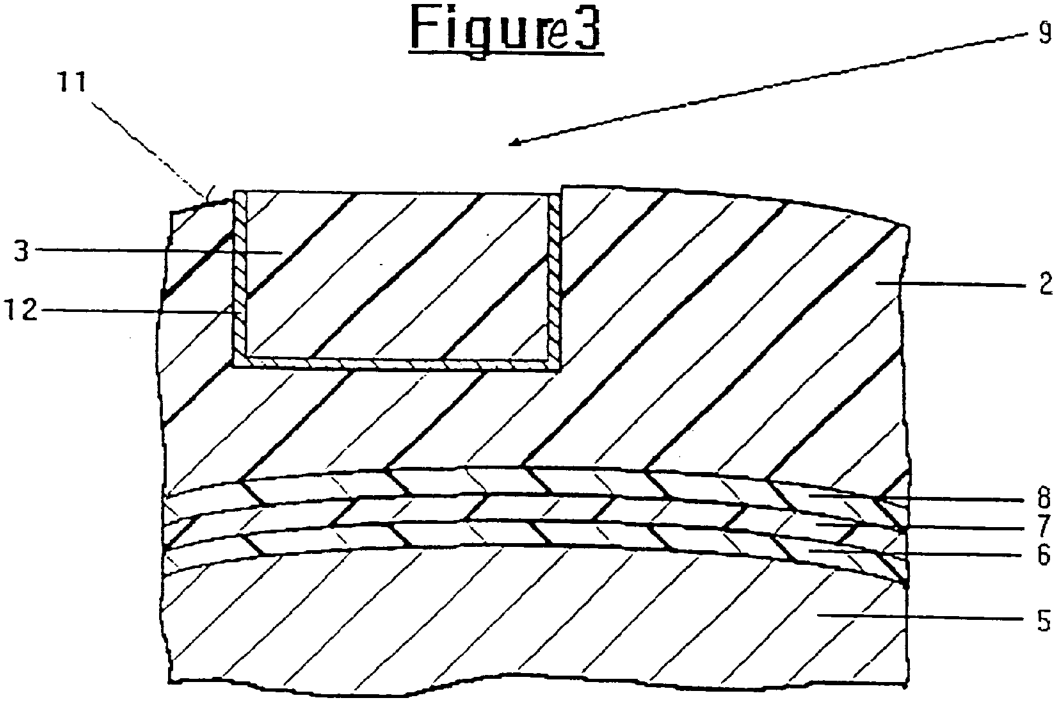
FIG. 3 shows FIG. 2 with a filler introduced into the cylindrical cutout and with an adhesive layer therebetween.

As can be seen in particular from the greatly exaggerated illustration according to FIG. 3, the curvature of the substrate 5 or of the visible surface 11 of the powder coating layer 2 should not be excessively great, since otherwise the margin of the filler 3 can project visibly or be offset beyond the margin of the cutout 1.

Such a discontinuity at these two margins can be compensated for, for example, using an appropriately flexible and resilient adhesive layer 12, which is provided in order to join the filler 3 to the walls of the cutout 1 surrounding it.

Figure 4:
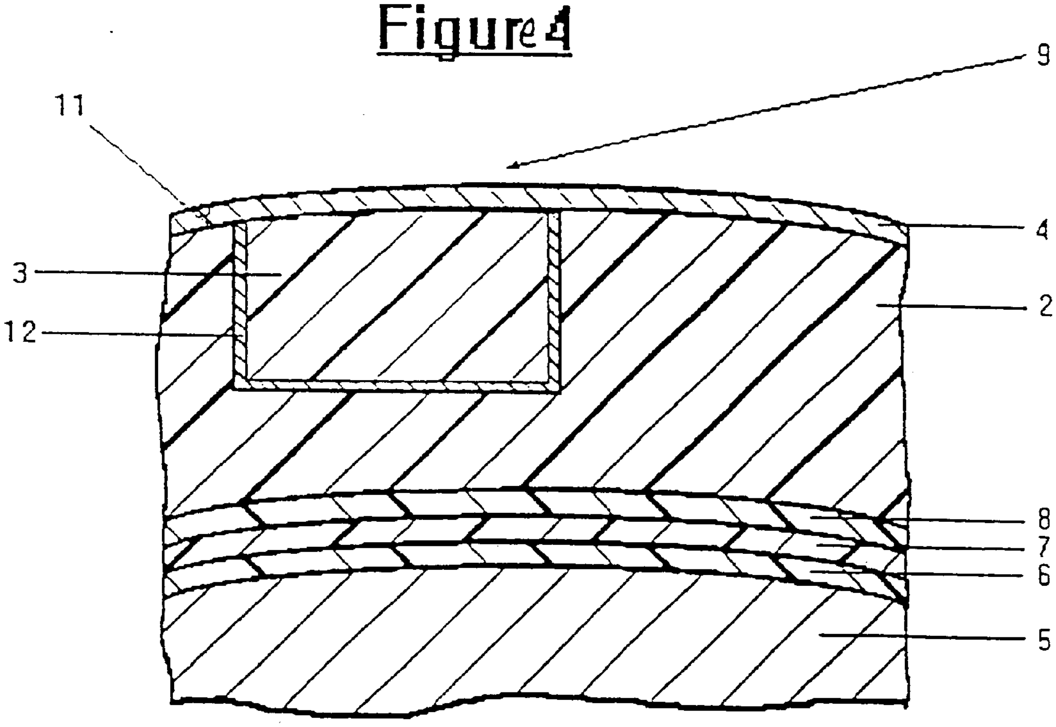
FIG. 4 shows FIG. 3 with a clear varnish layer applied over the powder coating layer.

Furthermore, with respect to the application of a further layer, in particular a clear varnish layer 4, to the powder coating layer 2, it is advantageous to perform the introduction of the cutout 1 and the filling of the cutout 1 with the filler 3 before the application of the clear varnish layer 4 (see FIG. 4).

Should a faulty point 9 only be noticed following any application of the clear varnish layer 4, the procedure for repair may be largely analogous, it now being advantageous to use for this a filler formed from the powder coating, which is additionally provided on the visible side with a clear varnish layer, the layer thickness of this clear varnish layer approximately corresponding to that clear varnish layer 4 which is otherwise arranged on the powder coating layer 2 of the substrate 5.

Figure 5:
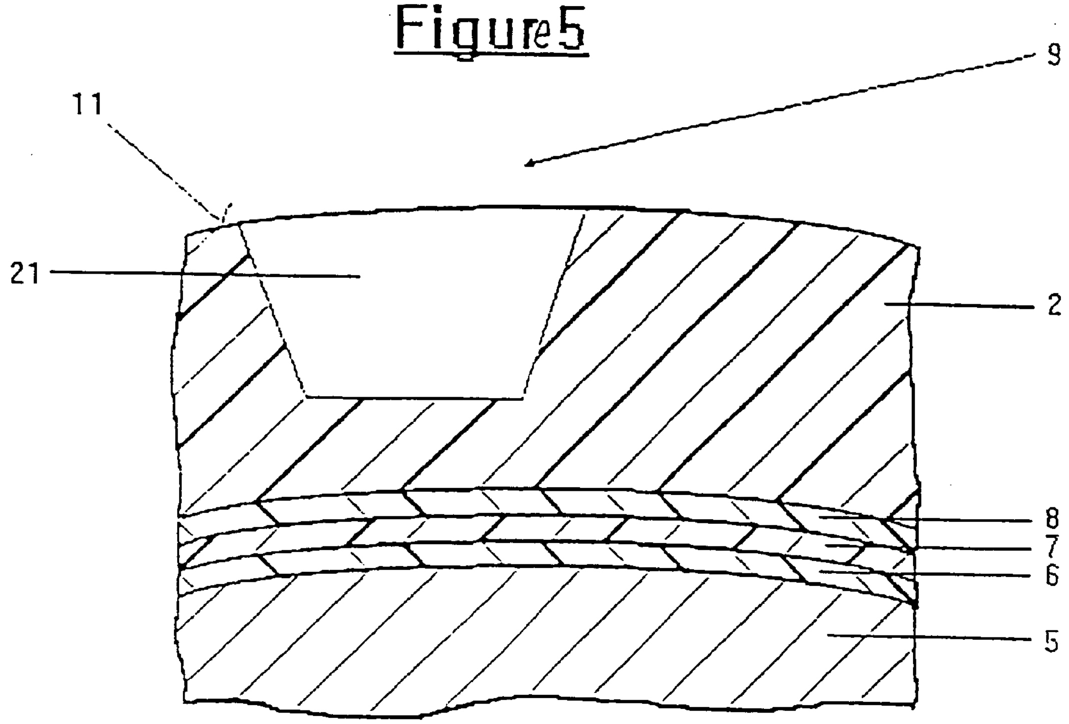
FIG. 5 shows FIG. 1 with the fault removed in a cutout having a truncated-cone-shaped cross-section.

In FIG. 5, in order to repair the faulty point 9 according to FIG. 1, the faulty point 9 of the powder coating layer 2, which is in particular set and hardened, is provided in a closely limited region with a truncated-cone-shaped cutout 21. By contrast with the cutout 1 according to FIG. 2, the cutout 21 therefore does not have a cylindrical but a truncated-cone-shaped cross-section, the cone tapering in towards the substrate 5. Here, too, as a result of the cutout 21 introduced to a maximum of the depth of the powder coating layer 2, the speck of dust 10 is removed at the same time.

Figure 6:
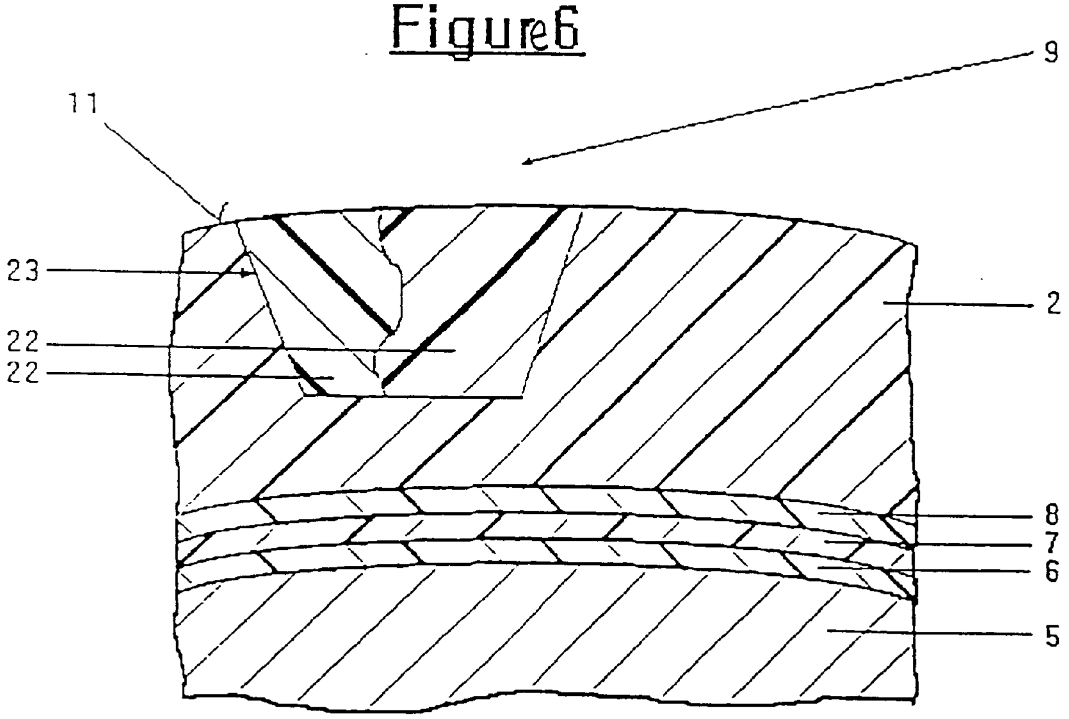
FIG. 6 shows FIG. 5 with a filler introduced into the truncated-cone-shaped cutout.

In order to avoid unnecessary repetitions, in this case of this exemplary embodiment according to FIGS. 5 and 6, only the differences will be discussed.

A filler 23 that is formed from powder coating and/or a pre-product of the powder coating and is in particular platelet-like is introduced into the truncated-cone-shaped cutout 21, the contour of the bottom of the filler 23 being flat and matched to the contour of the bottom of the cutout 21. The margins of the filler 23 are matched with respect to their geometrical dimensions and also with respect to their profile which, for example, at the time of introducing the cutout 21 may not necessarily be round but, if appropriate, may also be kidney-shaped, to the margins of the cutout 21.

In order to introduce the filler 23 into the cutout 21, the cutout is covered over its entire area with a paint film already previously described. The filler 23 is ejected from the covering paint film and, when being ejected, is directly introduced and/or pressed into the cutout 21.

In this case, it may occur that the filler 23 breaks apart into individual broken pieces 22. A filler formed from individual broken pieces 22 before being bonded to the remaining powder coating layer 2 is also to be understood in the sense of the invention as a coherent filler 23; that is to say the entire filler 3 arranged in the cutout 1 does not necessarily have to be completely monolithically constructed before being joined to the walls or to the bottom of the cutout 1.

The filler 23 arranged in the cutout 21 is joined to the powder coating layer 2 arranged outside the cutout 21 by means of the measures listed above. Differing from the exemplary embodiment according to FIGS. 2 to 4, the joining is performed here not with the aid of an adhesive layer 12 but by means of direct joining of the material of the filler 23 with the material surrounding it of the powder coating layer 2. Following application into the cutout, the partially cross-linked filler becomes completely cross-linked, for example via a reaction between the filler 23 and the surrounding walls of the cutout 21, whereby the filler becomes chemically set. Such a reaction may be initiated and/or aided by UV (ultraviolet) radiation and/or electromagnetic, in particular IR (infrared) radiation, and/or hot air. The joining of the filler 23 to the powder coating layer 2 does not, however, have to performed along the entire common area (mating dimensions), but can also be limited to only selected portions of the common areas. In the case of fillers 23 formed from broken pieces 22, the broken pieces 22 are joined to one another in the same way at the same time.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for repairing a paint fault in a powder coating layer, comprising the steps of:

removing a portion of said powder coating layer in an area proximate and surrounding said fault to define a cutout having dimensions;

forming a filler from an at least partially cross-linked component of said powder coating, said filler being formed to be at least partially coherent with dimensions corresponding to the dimensions of said cutout;

introducing said filler into said cutout; and joining said filler to said powder coating layer defining said cutout.

2. A process according to claim 1, wherein in said removing step the dimensions of said cutout extend to a maximum of a depth of the powder coating layer.

3. A process according to claim 1, wherein in said cutting step the cutout is formed by removing material.

4. A process according to claim 1, wherein in said removing step the cutout is formed by a process selected from the group consisting of: milling, cutting out with a hole saw, burning out with a laser, stamping, and grinding.

5. A process according to claim 1, wherein the filler is fully cross-linked during said joining step.

6. A process according to claim 1, wherein in said joining step the filler is cured by at least one of electromagnetic radiation and heating.

7. A process according to claim 1, wherein in said joining step the filler is cured by infrared radiation.

8. A process according to claim 1, wherein in said joining step the filler is cured by ultraviolet radiation.

9. A process according to claim 1, wherein in said forming step said filler is formed as a platelet with a layer thickness approximately corresponding to a depth of said cutout.

10. A process according to claim 1, wherein in said forming step said filler is formed with a volume with is equal to a volume of said cutout plus a volume shrinkage expected to occur during said joining step.

11. A process according to claim 1, wherein in said forming step said filler is formed with geometric dimensions corresponding to geometric dimensions of said cutout.

12. A process according to claim 1, wherein in said removing step said cutout is defined by a surrounding periphery of said powder coating layer and a flat bottom portion spaced at a depth from an exterior surface of said powder coating layer, and wherein in said forming step said filler is formed as a platelet having a flat bottom, a periphery corresponding to said periphery of the powder coating layer defining the cutout, and a height corresponding to said depth.

13. A process according to claim 1, further comprising the step of electrostatically spraying said filler prior to said introducing step.

14. A process according to claim 1, wherein in said forming step said filler is shaped from a previously produced paint film.

15. A process according to claim 1, wherein in said forming step said filler is shaped from a paint film.

16. A process according to claim 1, further comprising the step of applying a further layer to the powder coating layer subsequent to said joining step.

17. A process according to claim 1, wherein in said forming step an entire area of the cutout is covered over with a paint film formed of powder coating, and in said introducing step at least a portion of said covering paint film is ejected or pressed directly into said cutout to form said filler.

18. A process according to claim 1, wherein in said joining step the filler is adhesively bonded to said powder coating layer defining said cutout.

19. A process according to claim 1, wherein said filler consists of said powder coating.

20. A substrate having a powder coating layer thereon with a repaired area formed by:

removing a portion of the powder coating layer in an area proximate and surrounding a fault to define a cutout having dimensions;

forming a filler from an at least partially cross-linked component of said powder coating, said filler being formed to be at least partially coherent with dimensions corresponding to the dimensions of said cutout;

introducing said filler into said cutout; and joining said filler to said powder coating layer defining said cutout.

21. A repaired powder coating layer according to claim 20, wherein said filler consists of said powder coating.

* * * * *